United States Patent
Shkolnik et al.

(10) Patent No.: US 7,892,474 B2
(45) Date of Patent: Feb. 22, 2011

(54) CONTINUOUS GENERATIVE PROCESS FOR PRODUCING A THREE-DIMENSIONAL OBJECT

(75) Inventors: Alexandr Shkolnik, Los Angeles, CA (US); Ali El-Siblani, Dearborn Heights, MI (US); Hendrik John, Hünxe (DE)

(73) Assignee: Envisiontec GmbH, Gladbeck (DE)

( * ) Notice: Subject to any disclaimer, the term of this patent is extended or adjusted under 35 U.S.C. 154(b) by 1040 days.

(21) Appl. No.: 11/599,769

(22) Filed: Nov. 15, 2006

(65) Prior Publication Data

US 2008/0113293 A1    May 15, 2008

(51) Int. Cl.
B29C 35/08    (2006.01)
B29C 41/02    (2006.01)

(52) U.S. Cl. ..................................... 264/401
(58) Field of Classification Search ............... 264/401
See application file for complete search history.

(56) References Cited

U.S. PATENT DOCUMENTS

| | | |
|---|---|---|
| 4,837,379 A | 6/1989 | Weinberg |
| 4,929,402 A | 5/1990 | Hull |
| 4,999,143 A | 3/1991 | Hull et al. |
| 5,093,130 A | 3/1992 | Fujii et al. |
| 5,137,662 A | 8/1992 | Hull et al. |
| 5,139,338 A | 8/1992 | Pomerantz et al. |
| 5,143,663 A | 9/1992 | Leyden et al. |
| 5,157,423 A | 10/1992 | Zur |
| 5,171,490 A | 12/1992 | Fudim |
| 5,173,266 A | 12/1992 | Kenney |
| 5,174,931 A | 12/1992 | Almquist et al. |
| 5,236,637 A | 8/1993 | Hull |
| 5,247,180 A | 9/1993 | Mitcham et al. |
| 5,248,456 A | 9/1993 | Evans, Jr. et al. |
| 5,263,130 A | 11/1993 | Pomerantz et al. |

(Continued)

FOREIGN PATENT DOCUMENTS

DE    41 05 314    8/1991

(Continued)

OTHER PUBLICATIONS

Wohlers Report 2000, "Rapid Prototyping & Tooling State of the Industry Annual Worldwide Progress Report", T. Wohlers, Wohlers Association, Inc., Fort Collins, Colorado (2000).

(Continued)

*Primary Examiner*—Leo B Tentoni
(74) *Attorney, Agent, or Firm*—Hansen IP Law PLLC

(57) ABSTRACT

The invention describes a process and a device for producing at least one three-dimensional object, a photo-polymerizable material is solidified by means of simultaneous or almost simultaneous exposure of a build area or partial build area in a building plane via electromagnetic radiation, wherein a distance between a support plate, at which the object to be generated is built, and the building plane is changed during at least one exposure phase.

It is possible according to the invention to solidify the three-dimensional object in a main direction during a radiation phase exceeding a current prescribed hardening depth, without interrupting supply of electromagnetic energy during the irradiation phase. Further, it is possible to control a current hardening depth of the photopolymerizable material during a building phase. Embodiments of suitable devices are also described.

23 Claims, 3 Drawing Sheets

U.S. PATENT DOCUMENTS

| | | | |
|---|---|---|---|
| 5,268,994 A | 12/1993 | Keskes | |
| 5,289,214 A | 2/1994 | Zur | |
| 5,298,208 A | 3/1994 | Sibley et al. | |
| 5,306,446 A | 4/1994 | Howe | |
| 5,345,391 A | 9/1994 | Hull et al. | |
| 5,360,981 A | 11/1994 | Owen et al. | |
| 5,391,072 A | 2/1995 | Lawton et al. | |
| 5,447,822 A | 9/1995 | Hull et al. | |
| 5,510,077 A | 4/1996 | Dinh et al. | |
| 5,529,473 A | 6/1996 | Lawton et al. | |
| 5,545,367 A | 8/1996 | Bae et al. | |
| 5,569,431 A | 10/1996 | Hull | |
| 5,571,471 A | 11/1996 | Hull | |
| 5,630,981 A | 5/1997 | Hull | |
| 5,651,934 A | 7/1997 | Almquist et al. | |
| 5,653,925 A | 8/1997 | Batchelder | |
| 5,823,778 A | 10/1998 | Schmitt et al. | |
| 5,858,746 A | 1/1999 | Hubbell et al. | |
| 5,891,382 A | 4/1999 | Almquist et al. | |
| 5,894,036 A | 4/1999 | Tylko | |
| 5,902,537 A | 5/1999 | Almquist et al. | |
| 5,945,058 A | 8/1999 | Manners et al. | |
| 5,980,813 A | 11/1999 | Narang et al. | |
| 6,013,099 A | 1/2000 | Dinh et al. | |
| 6,027,324 A | 2/2000 | Hull | |
| 6,048,487 A | 4/2000 | Almquist et al. | |
| 6,051,179 A | 4/2000 | Hagenau | |
| 6,153,034 A | 11/2000 | Lipsker | |
| 6,158,946 A | 12/2000 | Miyashita | |
| 6,171,610 B1 | 1/2001 | Vacanti et al. | |
| 6,280,727 B1 | 8/2001 | Prior et al. | |
| 6,281,903 B1 | 8/2001 | Martin et al. | |
| 6,334,865 B1 | 1/2002 | Redmond et al. | |
| 6,352,710 B2 | 3/2002 | Sawhney et al. | |
| 6,391,245 B1 | 5/2002 | Smith | |
| 6,500,378 B1 | 12/2002 | Smith | |
| 6,547,552 B1 | 4/2003 | Fudim | |
| 6,630,009 B2 | 10/2003 | Moussa et al. | |
| 6,764,636 B1 | 7/2004 | Allanic et al. | |
| 6,833,231 B2 | 12/2004 | Moussa et al. | |
| 6,833,234 B1 | 12/2004 | Bloomstein et al. | |
| 6,942,830 B2 | 9/2005 | Mülhaupt et al. | |
| 6,974,656 B2 | 12/2005 | Hinczewski | |
| 6,989,225 B2 | 1/2006 | Steinmann | |
| 7,052,263 B2 | 5/2006 | John | |
| 7,073,883 B2 | 7/2006 | Billow | |
| 7,133,041 B2 | 11/2006 | Kaufman et al. | |
| 7,195,472 B2 | 3/2007 | John | |
| 7,215,430 B2 | 5/2007 | Kacyra et al. | |
| 7,261,542 B2 | 8/2007 | Hickerson et al. | |
| 7,467,939 B2 | 12/2008 | Sperry et al. | |
| 2001/0028495 A1 | 10/2001 | Quate et al. | |
| 2001/0048183 A1 | 12/2001 | Fujita | |
| 2002/0028854 A1 | 3/2002 | Allanic et al. | |
| 2002/0155189 A1 | 10/2002 | John | |
| 2003/0067539 A1 | 4/2003 | Doerfel et al. | |
| 2003/0074096 A1 | 4/2003 | Das et al. | |
| 2003/0205849 A1 | 11/2003 | Farnworth | |
| 2004/0008309 A1 | 1/2004 | Yamahara et al. | |
| 2005/0023710 A1 | 2/2005 | Brodkin et al. | |
| 2005/0208168 A1 | 9/2005 | Hickerson et al. | |
| 2005/0248061 A1 | 11/2005 | Shkolnik et al. | |
| 2005/0248062 A1 | 11/2005 | Shkolnik et al. | |
| 2005/0288813 A1 | 12/2005 | Yang et al. | |
| 2006/0078638 A1 | 4/2006 | Holmboe et al. | |
| 2006/0192312 A1 | 8/2006 | Wahlstrom et al. | |
| 2006/0239588 A1 | 10/2006 | Hull et al. | |
| 2006/0249884 A1 | 11/2006 | Partanen et al. | |
| 2007/0074659 A1 | 4/2007 | Wahlstrom | |
| 2007/0075458 A1 | 4/2007 | Wahlstrom et al. | |
| 2007/0075459 A1 | 4/2007 | Reynolds et al. | |
| 2007/0075460 A1 | 4/2007 | Wahlstrom et al. | |
| 2007/0075461 A1 | 4/2007 | Hunter et al. | |
| 2007/0077323 A1 | 4/2007 | Stonesmith et al. | |
| 2007/0120842 A1 | 5/2007 | Hess | |
| 2007/0257055 A1 | 11/2007 | Scott et al. | |
| 2007/0259066 A1 | 11/2007 | Sperry et al. | |
| 2008/0038396 A1 * | 2/2008 | John et al. | 425/174.4 |
| 2008/0054531 A1 | 3/2008 | Kerekes et al. | |
| 2008/0169586 A1 | 7/2008 | Hull et al. | |
| 2008/0169589 A1 | 7/2008 | Sperry et al. | |
| 2008/0170112 A1 | 7/2008 | Hull et al. | |
| 2008/0179786 A1 | 7/2008 | Sperry et al. | |
| 2008/0179787 A1 | 7/2008 | Sperry et al. | |
| 2008/0181977 A1 | 7/2008 | Sperry et al. | |
| 2008/0206383 A1 | 8/2008 | Hull et al. | |
| 2008/0217818 A1 | 9/2008 | Holmboe et al. | |
| 2008/0226346 A1 | 9/2008 | Hull et al. | |
| 2008/0231731 A1 | 9/2008 | Hull | |
| 2008/0309665 A1 | 12/2008 | Gregory, II | |

FOREIGN PATENT DOCUMENTS

| | | |
|---|---|---|
| DE | 41 02 257 | 7/1992 |
| DE | 41 25 534 A1 | 2/1993 |
| DE | 93 19 405 | 5/1994 |
| DE | 43 40 108 | 8/1997 |
| DE | 197 27 554 | 1/1999 |
| DE | 299 11 122 | 11/1999 |
| DE | 198 38 797 | 3/2000 |
| DE | 199 29 199 A1 | 1/2001 |
| DE | 100 03 374 | 8/2001 |
| DE | 100 18 987 | 10/2001 |
| DE | 201 06 887 | 10/2001 |
| DE | 699 09 136 | 5/2004 |
| EP | 0 250 121 | 12/1987 |
| EP | 0 426 363 | 5/1991 |
| EP | 0 435 564 A2 | 7/1991 |
| EP | 0 466 422 A1 | 1/1992 |
| EP | 0 484 086 A1 | 5/1992 |
| EP | 1 250 995 | 10/2002 |
| EP | 1 250 997 | 10/2002 |
| EP | 1 270 185 | 1/2003 |
| EP | 1 192 041 | 3/2003 |
| EP | 1 156 922 | 6/2003 |
| EP | 1 338 846 | 8/2003 |
| EP | 1674243 A2 | 6/2006 |
| EP | 1 849 587 | 10/2007 |
| EP | 1 880 830 | 1/2008 |
| EP | 1 894 704 | 3/2008 |
| EP | 1 950 032 | 7/2008 |
| EP | 2 011 631 | 1/2009 |
| FR | 2 254 194 | 7/1975 |
| FR | 2 583 334 | 12/1986 |
| FR | 2 634 686 | 2/1990 |
| FR | 2 692 053 | 12/1993 |
| JP | 04371829 | 12/1992 |
| JP | 08192469 | 7/1996 |
| WO | WO 95/11007 | 4/1995 |
| WO | WO-96/00422 | 1/1996 |
| WO | 0100390 | 1/2001 |
| WO | WO 01/00390 | 1/2001 |
| WO | WO-01/12679 | 2/2001 |
| WO | WO-0114125 A1 * | 3/2001 |
| WO | WO-01/72501 A1 | 10/2001 |
| WO | WO-03/059184 | 7/2003 |
| WO | WO 2005/110722 | 11/2005 |

OTHER PUBLICATIONS

Stark, G.B., et al., "Biological Matrices and Tissue Reconstruction", Springer Publications, Berlin (1998).

Sachs, E., et al., "Three Dimensional Printing: Rapid Tooling and Prototypes Directly from CAD Model", Journal of Engineering for Industry, 114:481-488 (1992).

Kuhtreiber, W., Ph.D., et al., "Cell Encapsulation Technology and Therapeutics", Birkhauser, Boston (1998).

Landers, R., and Mulhaupt, R., "Desktop Manufacturing of Complex Objects, Prototypes and Biomedical Scaffolds by Means of Computer-Assisted Design Combined with Computer-Guided 3D Plotting of Polymers and Reactive Oligomers," Macromolecular Materials and Engineering, 282:17-22 (2000).

Okada, T., and Ikada, Y., "Tissue Reactions to Subcutaneously Implanted, Surface-Modified Silicones", Journal of Biomedical Materials Research, 27:1509-1518 (1993).

Relou, I.A., et al., "Effect of Culture Conditions on Endothelial Cell Growth and Responsiveness", Tissue & Cell, 30(5):525-538 (1998).

Nikolaychik, V.V., et al., A New, Cryopreciptate Based Coating for Improved Endothelial Cell Attachment and Growth on Medical Grade Artificial Surfaces:, ASAIO Journal, 40:M846-M852 (1994).

Burns, "Automated Fabrication", Improving Productivity in Manufacturing, 1993, (ISBN 0-13-119462-3).

Opposition to EP 1,849,587, dated Apr. 8, 2010.

C. Sun, et al., "Protection Micro-Stereolithography Using Digital Micro-Mirror Dynamic mask," Sensors and Actuators A 121 (2005) 113-120.

S. Ventura, et al., "Freeform Fabrication of Functional Silicon Nitride Components by Direct Photoshaping," Mat. Res. Sol. Symp. Proc., vol. 625 (2000).

K. Takahashi, "A New Application of DMD to Photolithography and Rapid Prototyping System," Institute of Electronics, Information, and Communication Engineers.

* cited by examiner

CONTINUOUS GENERATIVE PROCESS FOR PRODUCING A THREE-DIMENSIONAL OBJECT

TECHNICAL FIELD

The present invention relates to a process and a device for producing a three-dimensional (3D) object by solidification of a material solidifyable under the supply of energy such as electromagnetic radiation. The solidifyable material normally comprises a resin which is photopolymerizable, light-hardenable or otherwise solidifyable by any stimulating energy.

PRIOR ART

For the step-wise or layer-wise construction of three-dimensional objects from photo- and particularly light-hardenable polymers or resins, various processes are mentioned in the literature, see "Automatic Fabrication—Improving Productivity in Manufacturing" of Marshall Burns, 1993 (ISBN 0-13-119462-3) in this regard.

For example, in conventional stereolithography systems a support plate is provided within a container filled with photopolymerizable or light-hardenable material, wherein a layer at the surface of the material is selectively irradiated, e.g. by means of a scanning laser beam, until a defined layer thickness is hardened. After hardening a layer, the support plate is lowered by the following layer thickness, and a new non-hardened material is applied.

In the selective irradiation by laser, where a punctual energy supply is included and where not the whole building area is irradiated at once or almost at once, separate layers must be hardened and moved away together with the support plate, in order to avoid construction defects and to obtain building parts as accurate as possible. By the building in layers, the conventional stereolithography process must be carried out with a multitude of corresponding steps per layer.

OBJECT OF THE INVENTION

It is an object of the invention to provide an improved process and an improved device for producing a three-dimensional object by solidifying a material solidifyable by supply of stimulating energy such as electromagnetic irradiation.

SUMMARY OF THE INVENTION

According to a first aspect, the present invention provides: a process for producing at least one three-dimensional object, comprising the step of solidifying a photo-polymerizable material by means of simultaneous or almost simultaneous exposure of a build area or partial build area in a building plane via electromagnetic radiation, wherein a distance between a support plate, at which the object to be generated is built, and the building plane is changed during at least one exposure phase.

According to a second aspect, the present invention provides: a process for producing at least one three-dimensional object through solidifying a photopolymerizable material by means of simultaneous or almost simultaneous exposure in a building plane via electromagnetic radiation, wherein the three-dimensional object is solidified in a main building direction during an irradiation period to an amount exceeding a prescribed current hardening depth, without interrupting supply of electromagnetic energy during the irradiation period.

According to a third and fourth aspect, the present invention provides: a process for producing at least one three-dimensional object comprising a step of solidifying a photopolymerizable material by means of simultaneous or almost simultaneous exposure in a building plane via electromagnetic radiation, wherein a current hardening depth of the photopolymerizable material during a building period is controlled by a speed of the support plate supporting the object to be generated moving away from the building plane. Alternatively to, or in combination with this control, a current curing depth of the photopolymerizable material during a continuous building period is controlled by an irradiation intensity of each individual pixel of a projected rasterized image mask.

According to a further aspect, the present invention provides a device for producing at least one three-dimensional object by solidifying a photopolymerizable material, comprising: a device for simultaneous or almost simultaneous supply of electromagnetic energy to a build area or partial build area in a building plane via electromagnetic radiation; a support plate capable of supporting the object to be generated; and a control unit arranged to control the device for supply of electromagnetic energy such that a distance between the support plate and the building plane is changed during at least one irradiation period.

According to a still further aspect, the present invention provides a device for producing at least one three-dimensional object by solidifying a photopolymerizable material, comprising: a device for simultaneous or almost simultaneous supply of electromagnetic energy into a building plane via electromagnetic radiation; and a control unit arranged to control the device for supply of electromagnetic energy such that the three-dimensional object is solidified in a main building direction during an irradiation period to an amount exceeding a prescribed current hardening depth, without interrupting supply of electromagnetic energy during the irradiation period.

By applying the process of the invention, it is possible to provide at least one three-dimensional object formed from photopolymerised material through electromagnetic irradiation by uninterrupted photopolymerising the photopolymerizable material being built continuously, but without formation of any one of separately polymerised structure elements that might include separate layers, dots and strands of the material.

The term "at least" one three-dimensional object used herein means, that the process of the invention can be used to form a complete 3D-object or only a part of a whole 3D-object, or multiple 3D-objects or partial 3D-objects at the time or at different times, including a case, where multiple partial structures of a complex object are formed at the same time or at different times. The terms "partial object" or "partial structures" mean not only desired structures of the three-dimensional final object, but also support objects or support structures which are generated only as demanded by the process and which are not anymore contained in the final three-dimensional (3D) object.

DESCRIPTION OF THE INVENTION AND OF ITS ADVANTAGES

Within the framework of the present invention it was surprisingly found that—contrary to the conventional stereolithography technique—a complete layer-wise generation of the three-dimension object can be dispensed with; it was found that a layer-independent operation can be carried out and that a device can be correspondingly arranged.

Conventional processes and devices of the prior art are improved by the solution of the problem according to the present invention and its preferred embodiments, and the subsequently described features can be provided, or the respectively mentioned advantages can be achieved alone, alternatively or in combination:

During a continuous (uninterrupted) exposure operation, i.e. during at least one irradiation phase and preferably during the whole building process of the three-dimensional object, the distance between a support plate for the three-dimensional object and the building plane can be varied continuously, i.e. without interruption.

Thereby, it is not required according to the present invention that the material solidifies in a process with multiple steps and respectively with layer-formation to be performed per step. If, due to possible irradiation interruptions, some slight interface layer formation would still occur, such an interface formation can be minimized to a low number or even totally eliminated; for example limited to changes of different irradiation areas, or to changes of different bitmaps per irradiation plane respectively used for different structural sections of the three-dimensional object.

Further, the building process is accelerated according to the invention.

By obviating a layer-construction, it is further possible to dispense with a generation of sliced image data.

The continuous change of the said distance according to the present invention can be realized depending on the desired embodiment, by moving the support plate away from the building plane, and/or by moving the construction plane or the fill level of the photopolymerizable material away from the support plate. The latter can be carried out in the case of an irradiation from above the support plate by lifting the building plane or by raising the fill level of the photopolymerizable material relative to the support plate. A moving away of the support plate from a pre-set building plane is preferred according to the invention.

When the said distance is continuously changed according to the invention during an irradiation operation and preferably during the whole building process of the three-dimensional object, structure steps in the main building direction (typically the vertical Z-direction)—different from the conventional layer-wise process—can be reduced and advantageously minimized, or may even be adjusted to a continuous gradation down to an absence of structure steps. Unlike the conventional layer-wise process, distinct structure steps in Z defined by predetermined layers are not required. Rather, structure steps in the Z-building direction can be flexibly controlled depending on building conditions, and optionally can be variably adjusted or may even be realized in the form of a continuously gradual structure.

The three-dimensional object is allowed to solidify or grow in the main building direction (typically in the Z-direction) without interrupting the supply of electromagnetic energy respectively during an irradiation phase and optionally during the whole building process. The corresponding continuous growth of solidifyable material in the main building (Z-) direction during an irradiation phase may thus proceed at an extent exceeding a usual hardening depth which was applied in the conventional layer-wise solidification and which is predetermined by the used supply of electromagnetic energy (irradiation) and/or by a used polymerizable material. Hence, it is possible by the operation according to the invention to significantly extent irradiation phases relative to conventional layer-wise irradiations, and to obtain continuous uniform (extended) hardening depths during these phases, that exceed conventional layer-hardening depths of typically in the micrometer range several fold. A continuous uniform (extended) hardening depth respectively realizable by an irradiation phase according to the invention may, for example, lie in orders in the range of significantly above 1 mm, preferably at above 2.5 mm, more preferably at above 1 cm and possibly even at above 10 cm. If desired, a continuous (uninterrupted) uniform solidification in bulk may even be provided in the whole three-dimensional object by avoiding substantial irradiation interruptions.

By the layer-independent continuous operation, it is even possible according to the invention to specifically influence and to control a current hardening depth of the photopolymerizable material. An adjustment of the speed of the support plate supporting the object to be generated moving away from the building plane, and an adjustment of the irradiation intensity of pixels (grey value or color value), respectively alone or in combination, are particular means for controlling the hardening depth.

A preferable uninterrupted (continuous) operation for supply of electromagnetic energy assists in the operability of a projection unit and/or simplifies the structure of the whole device. Further, it is possible to reduce the amount of data required for building a three-dimensional object, to reduce calculation demands therefor and thus to improve computing efficiency.

The process and the device according to the invention may respectively be designed flexible such that, for building a whole three-dimensional object, predetermined, optionally multiple uninterrupted irradiation phases on one hand, but at least one phase without or with reduced irradiation of the building plane on the other hand may be included. The change of the said distance as described above is provided during the uninterrupted irradiation phase(s), optionally also during the at least one phase without or with reduced irradiation of the building plane. An at least one phase with reduced, optionally even without irradiation of the building plane is utilized, not necessarily but possibly, for example for one or more of the following operations or conditions:

when changing the irradiated sectional area in the building plane, when changing the exposure mask per sectional area, when applying a shutter, and/or when applying a smoothening element such as a wiper.

The duration of the at least one phase without irradiation of the building plane, if applied, may respectively be short and preferably very short, for example up to maximally 10 s, preferably up to maximally 1 s, more preferably up to maximal 10 ms, and particularly up to maximally 1 ms.

A further advantage of the invention however consists in that the interruption of the irradiation does not necessarily have to be carried out; irradiation may be continued to be operated, e.g. during the aforementioned operations or conditions.

A change of the said distance may be adjusted variably during the building process. In this manner, the degree of hardening can be controlled, preferably by the moving speed in the main building direction such as the Z-direction.

By the continuous movement process in the main building direction such as the Z-direction, components of a device such as a wiper or the like may be applied layer-independently. Unlike a conventional building manner, components of the device can be applied by considering other aspects that are more favorable for the building process or for the generated three-dimensional object, e.g. a length in Z-direction having the same cross-sectional area in the horizontal (XY) building plane.

It is possible to carry out an optimized irradiation process, wherein a new exposure mask is generated or used not before the (XY) cross-sectional area changes along the Z-height or Z-position.

Thus, it can be worked with any high resolution in Z for the exposure masks respectively projected consecutively depending on the moved Z-height or Z-position.

In order to avoid defects during the building process, particularly when supplying the electromagnetic irradiation such as the light exposure, it is important to irradiate the built area to be irradiated simultaneously or almost simultaneously, i.e. the XY cross-sectional area or XY partial cross-sectional area of the building plane and preferably the whole built area to be currently irradiated respectively.

This can be realized by a projection system by means of mask exposure, ensuring a simultaneous irradiation. A particularly preferred projection system for generating an exposure mask is based on the DLP®/DMD (digital light processing/digital micromirror device)—technique known as such.

An alternative to the mask exposure is represented by an irradiation by a projection system, wherein a stationary image or an almost stationary exposure image is generated and thus an almost simultaneous irradiation is achieved, for example by a laser-based projection system with a sufficiently fast scanning of the desired built area in the building plane to be irradiated. An almost simultaneous irradiation, or a sufficiently fast scanning is typically achieved when an image is generated that is stationary or almost stationary for human eyes. Suitable ranges of image frequencies or refresh rates for generating an image to be stationary or almost stationary for human eyes are known from video techniques and projection techniques and can be correspondingly applied. An example of a projection system using an image that is stationary for human eyes is described in WO 01/14125A1; however, the present invention is by no means limited to the use of such a projection system for providing an almost simultaneous irradiation.

As photopolymerizable or solidifyable material according to the invention, any material is meant, possibly comprising a resin and optionally further components, which is solidifyable by supply of stimulating energy such as electromagnetic irradiation, e.g. UV-irradiation, visible light, IR-irradiation, electron beam irradiation, X-ray irradiation or the like. Suitably, a material polymerizable by UV-irradiation and/or by visible light can be used as such material, for example a material comprising a resin containing at least one ethylenically unsaturated compound (including but nor limited to (meth)acrylate monomers and polymers) and/or at least one epoxy group. Suitable other components of the solidifyable material include, for example, inorganic and/or organic fillers, coloring substances, viscose-controlling agents, but are not limited thereto.

As smoothening element, a wiper, a bar or blade, a roll, a slider or the like may be used. A "doctor plade"-process, wherein a vacuum container acts as an auxiliary material reservoir and "wipes" across the surface, or the known "curtain coating"-process are preferred.

The system according to the invention allows the provision of a three-dimensional object, which has been formed by electromagnetic irradiation of a photopolymerizable material by a photopolymerization with continuous material construction, but without separately polymerized structure elements that might be formed from layers, dots or strands of the photopolymerizable material. The three-dimensional object provided by the invention thus differs from conventional three-dimensional objects obtained through other free-form building techniques particularly by the photopolymerization in bulk, without or insignificantly having interfaces between separately hardened portions of that photopolymerizable material. Unlike the conventional stereolithography or other conventional free-form building techniques such as selective laser sintering, ballistic particle production, fusion deposition modeling, three-dimensional printing, three-dimensional plotting or other rapid prototyping processes, three-dimensional objects having no separate layers or individual material strands or dots can be provided through the uninterrupted (continuous) stereolithography process obviating formation of layers, strands or dots. The technique according to the invention is particularly suitable for providing a three-dimensional object which comprise different sectional areas in the direction of continuous material construction.

BRIEF DESCRIPTION OF THE DRAWINGS

The present invention will be subsequently explained illustratively and in a non-limiting manner by means of drawings. In the drawings.

DESCRIPTION OF PREFERRED EMBODIMENTS

Figure 1:
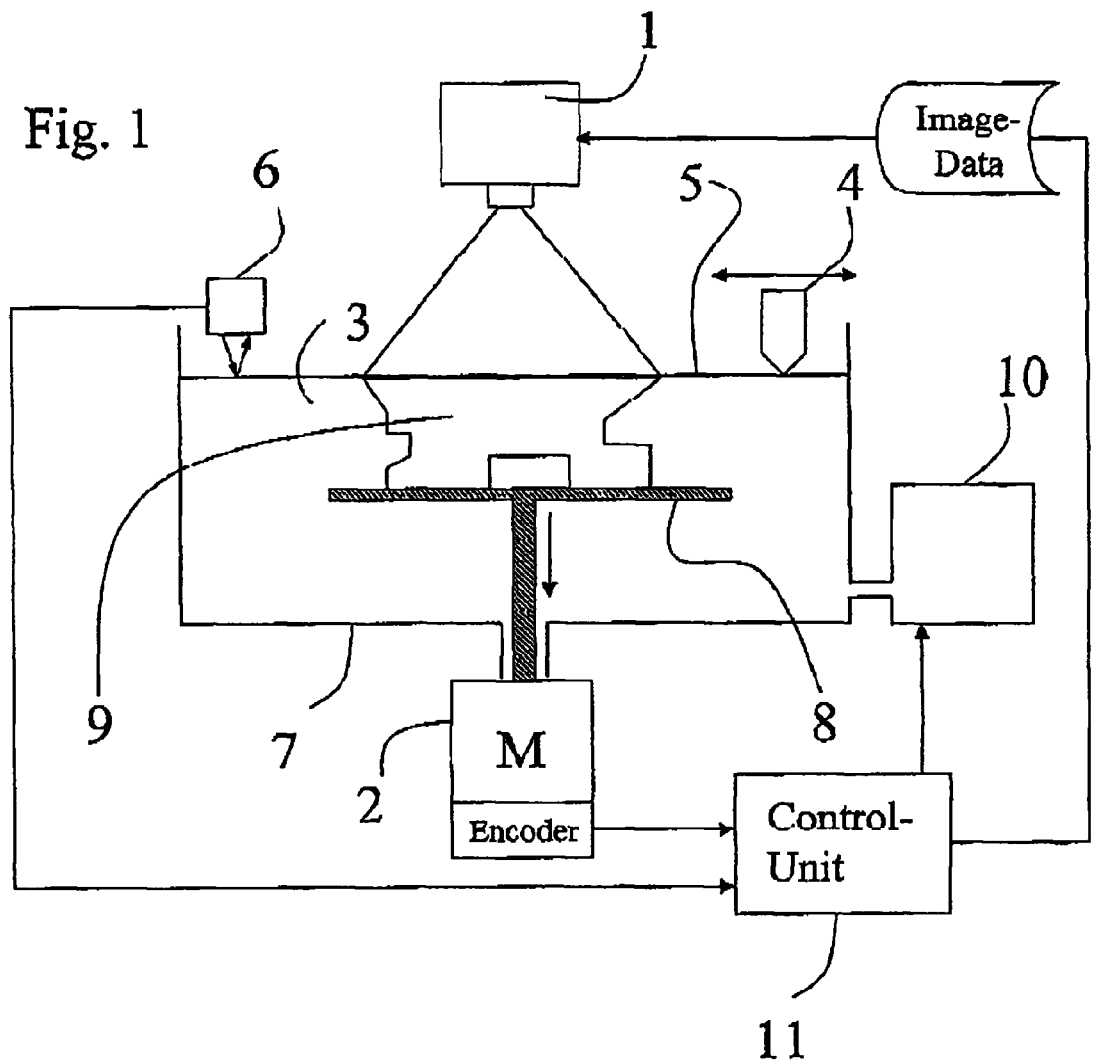
FIG. 1 shows a schematic basic scheme of a process or a device (in cross-section) according to a preferred embodiment of the present invention, where irradiation is carried out from the top.

The structure in FIG. 1 schematically shows, in cross-section, an embodiment of the device of the invention for a rapid prototyping process on the basis of photo-solidification by means of laser or mask exposure by means of a projection unit 1, wherein below the projection unit, a liquid material 3 containing a photopolymer (photopolymerizable resin) is provided in a container 7 with a level of the surface 5 of the liquid material 3. Here, the surface 5 of the liquid material 3 simply forms the projection plane of the projected image and thus defines the building plane. Other liquid or at least flowable material 3 may be formed by a liquid photopolymer as such, or by a mixture or solution of the photopolymer with a carrier material. A support plate 8 moveable in vertical direction is provided in the container and thus within the liquid material. The position of the support plate 8 in Z is known at any time and may be controlled via the control unit 11, either by an encoder, or by the use of a motor (M) 2. In this embodiment, the fill level of the material during the building process is kept constant. The fill level and thus the position of the surface 5 in Z can be determined by a fill level sensor 6 and may be re-adjusted via a reservoir 10 containing further liquid polymer material 3.

The support plate 8 (with the object generated) is continuously moved down from the material surface, wherein the hardening depth of the selectively irradiated photopolymer can be controlled by the moving speed. A wiper 4 can be moved or placed horizontally at a defined height above the building plane or the material surface, in order to eliminate a convex or concave curving of the material in the building plane (e.g. positive or negative meniscus) being possibly caused during the continuous generation, and to re-establish a planar or essentially planar building plane or material surface.

During the continuous movement of the support plate, irradiation may be interrupted, e.g. during an agitation of the wiper, or during the generation of a new projection image. A full interruption, or a partial reduction of the irradiation may be realized preferably by a shutter, e.g. via an electromechanic element (not shown) positioned in the irradiation path, or by the use of a projection system by changing or adjusting brightness parameters and/or contrast parameters of the image forming unit.

In this preferred embodiment, the support plate is moved during the whole building process continuously away from the building plane with a constant or a variable speed. Here, the change of the moving speed influences the hardening degree of the light-hardening resin and thus can be specifically controlled/adjusted during the building process, e.g. in order to achieve an over-exposure or sub-exposure in a part of the construction.

By lowering the generated object on the support plate away from the building plane below the material surface, new and fresh material which is not yet polymerized onto the object flows from the outside and fills the lowered portion.

This re-flow, or material supply may be assisted periodically or alternatingly by a wiper.

The alternating or periodic horizontal movement or placement of a bar or blade, a wiper or a slider in a defined height above the building plane or the material surface may also be utilized to eliminate a convex or concave curving of the material in the building plane (e.g. positive or negative meniscus) that is possibly caused by the continuous generation, and to re-establish a planar or essentially planar building plane or material surface.

When interrupting irradiation, e.g. for the purpose of a new image formation and/or for the movement of a wiper, the moving speed of a support plate can be reduced to a minimum.

Figure 2:
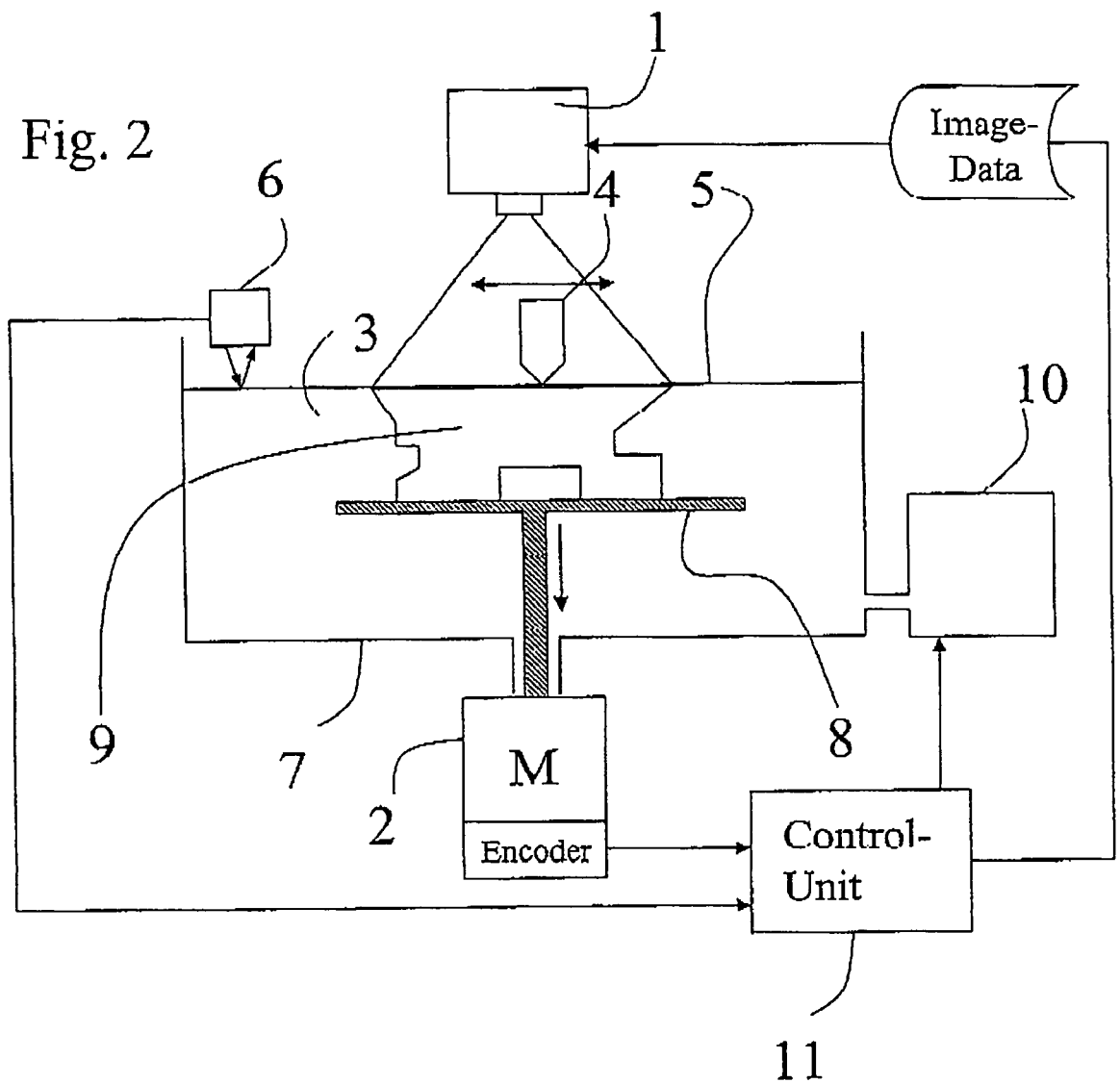
FIG. 2 shows a schematic basic scheme of a process or a device (in cross-section) according to a particular operation in an embodiment, wherein a smoothening element is agitated concurrently during an irradiation phase.

A particular operation is shown in FIG. 2, which concerning process and device corresponds to that of FIG. 1—having respectively corresponding reference signs for the same shown components—, which however specifically illustrates the peculiarity, that the wiper 4 is agitated alternating at desired points of time, or periodically during an irradiation phase and thereby smoothens the material surface in the building plane. This operation allows for a continuous process without interrupting the irradiation, optionally except for a short interruption of irradiation required possibly for a novel image formation or for the generation of a new exposure mask. However, if necessary, also the operation according to FIG. 2 allows additional wiper applications during optional interruptions of the irradiation.

The embodiments illustrated in FIG. 1 and FIG. 2 can be modified. For example, instead of defining the surface 5 of the photopolymer material 3 to represent the building plane as in FIGS. 1 and 2, a reference plane of a suitable transparent material may be provided in the building plane, into which the exposure image is projected. Further, in addition to the movement of the support plate 8, or alternatively thereto, the change of the distance between the support plate and the building plane may be effected by raising the level (at surface 5). This raising may be monitored and controlled by the fill level sensor 6, the material reservoir 10 and the control unit 11.

Further, instead of an irradiation from above as shown in FIG. 1, an inverse structure may be provided, wherein an irradiation then occurs from below, and the above-located support plate moves up. In this modified embodiment, a fill level sensor 6 and a wiper 4 may be omitted.

Figure 3:
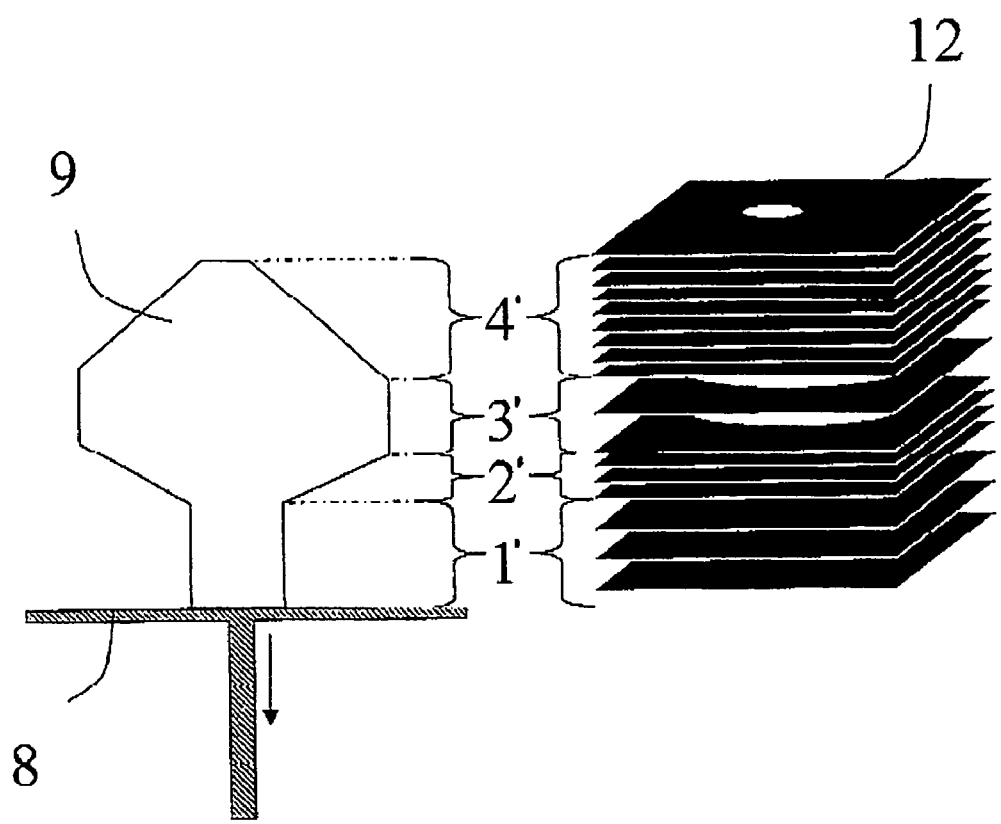
FIG. 3 shows a schematic scheme of a process or a device (in cross-section on the left; in perspective on the right) in a detailed view according to a further preferred embodiment of the present invention.

In FIG. 3, a detailed view illustrates, by referring to a further preferred embodiment, that the present invention enables a highly variable, yet very simple technique for producing a three-dimensional object layer-independently or without layers. Analogous to FIGS. 1 and 2, reference signs 8 and 9 respectively indicate the support plate moving down—away from the building plane 5—and the three-dimensional object continuously generated thereon. Sections 1', 2', 3' and 4' respectively denote particular construction sections of the three-dimensional object 9. Bitmaps 12 are indicated schematically for the image formation of the image-forming unit 1 respectively associated with corresponding sections 1', 2', 3' and 4'. In principle, the exemplified association illustrates in this manner that a relatively low number or optionally even only one bitmap 12 is required for sections 1', 3' of the three-dimensional object 9 where circumferences practically remain unaltered, whereas a relatively higher number of bitmaps 12 is required for sections 2', 4' where circumferences do change. The moving speed of the support plate can also be selectively adjusted to the respective sections, in order to generate sections practically free of layers. For example, a relatively high moving speed can be chosen for structurally simple sections 1', 3', whereas however a relatively low moving speed can be chosen for structurally complicated sections 2', 4'.

The above description of preferred embodiments is merely illustrative for explanation; rather, any variations and combinations of the described features and advantages are possible within the scope of the invention.

The invention claimed is:

1. A process for producing at least one three-dimensional object, comprising the step of solidifying a photo-polymerizable material by means of mask exposure of a build area or partial build area in a building plane via electromagnetic radiation from a digital light processing/digital micromirror device projection system, wherein a distance between a support plate, at which the object to be generated is built, and the building plane is changed during at least one exposure phase, and wherein the process comprises at least one phase during which the supply of electromagnetic radiation to the building plane is interrupted while the distance between the support plate and the building plane is further changed.

2. The process according claim 1, wherein the distance between the support plate and the building plane is changed by moving the building platform away from the building plane.

3. The process according claim 1, wherein the distance between the support plate and the building plane is changed during the whole building process.

4. The process according claim 2, wherein the photopolymerizable material is provided in a container, and the fill level of unpolymerised material within the container is kept constant during the building process.

5. A process for producing at least one three-dimensional object through solidifying a photopolymerizable material by means of mask exposure in a building plane via electromagnetic radiation from a digital light processing/digital micromirror device projection system, wherein the three-dimensional object is solidified in a main building direction during an irradiation period to an amount exceeding a prescribed current hardening depth, without interrupting supply of electromagnetic energy during the irradiation period.

6. The process according claim 1, wherein a material supply of unpolymerized photopolymerizable material occurs automatically by flowing.

7. The process according claim 1, wherein a material supply of unpolymerized photopolymerizable material occurs periodically or alternating by a blade or wiper.

8. The process according claim 1, wherein a convex or concave curving of the photopolymerizable material appearing in the building plane during the continuous generation of the three-dimensional object is eliminated by an alternating or periodical horizontal movement or placement of a smoothening element in a defined height above the building plane to reestablish a planar or essentially planar material surface.

9. The process according claim 7, wherein during the placement or movement of a wiper, blade or smoothening element, the continuous generation of the three-dimensional object, including an uninterrupted exposure and/or a continuous movement of support plate, is not interrupted.

10. A process for producing at least one three-dimensional object comprising a step of solidifying a photopolymerizable material by means of mask exposure in a building plane via electromagnetic radiation from a digital light processing/digital micromirror device projection system, wherein a current hardening depth of the photopolymerizable material during a building period is controlled by a speed of the support plate supporting the object to be generated moving away from the building plane.

11. A process for producing at least one three-dimensional object comprising the step of solidifying a photopolymerizable material by means of mask exposure in a building plane via electromagnetic radiation from a digital light processing/digital micromirror device projection system, wherein a current curing depth of the photopolymerizable material during a continuous building period is controlled by an irradiation intensity of each individual pixel of a projected rasterized image mask and by the control of speed of the support plate supporting the object to be generated moving away from the building plane.

12. The process according to claim 1, wherein the interruption of the supply of electromagnetic irradiation to the building plane is limited to phase(s) in which a smoothening element is agitated, and/or in which a new exposure image is generated.

13. The process according to claim 1, wherein during the interruption of supply of electromagnetic irradiation to the building plane, a speed of moving the support plate away from the building plane is reduced to a minimum.

14. The process according claim 1, wherein said building plane is defined by a surface of the photopolymerizable material.

15. The process according to claim 1, wherein the projection system projects electromagnetic radiation to the build area or partial build area in accordance with pixels having gray scale or color values.

16. The process according to claim 1, wherein the three-dimensional object is layerless.

17. A process for producing a three-dimensional object, comprising:
providing a solidifiable material capable of solidification upon exposure to electromagnetic radiation;
providing a plurality of bitmaps corresponding to the three-dimensional object;
providing a digital light processing/digital micromirror device mask projection system for exposing a solidifiable material, wherein the mask projection system projects electromagnetic radiation onto an exposed surface of the solidifiable material in a build area in accordance with pixels, and each pixel has an intensity defined by a gray scale value or a color value;
providing an object support plate, wherein the object support plate defines a distance between the object support plate and the build area; and
projecting electromagnetic radiation into the build area in accordance with the plurality of bitmaps while varying the distance between the build area and the object support plate.

18. The process of claim 17, wherein the step of varying the distance between the build area and the object support plate comprises moving the object support plate away from the build area.

19. The process of claim 17, wherein the object comprises a first region having a constant circumference, and a second region having a varying circumference, the plurality of bitmaps comprises a first number of bitmaps corresponding to the first region, and a second number of bitmaps corresponding to the second region, and the second number is greater than the first number.

20. The process of claim 17, wherein the object is layerless.

21. The process of claim 17, wherein the step of projecting electromagnetic radiation into the build area comprises projecting a plurality of images into the build area.

22. The process of claim 21, wherein the step of projecting electromagnetic irradiation into the build area in accordance with the plurality of bitmaps comprises multiple uninterrupted irradiation phases wherein during each uninterrupted irradiation phase, the distance between the object support plate and the build area is varied.

23. The process of claim 22, wherein each uninterrupted irradiation phase corresponds to one image from the plurality of images.

* * * * *